United States Patent [19]

Kaltz et al.

[11] 4,422,687
[45] Dec. 27, 1983

[54] SLIDING ROOF PANEL ASSEMBLY

[75] Inventors: Milton C. Kaltz, Allen Park; Edward M. Chojnowski, Northville; David C. Garascia, Novi; Barney J. Bauer, Howell; Richard D. George, Brownstown, all of Mich.

[73] Assignee: American Sunroof Corporation, Southgate, Mich.

[21] Appl. No.: 427,429

[22] Filed: Sep. 29, 1982

Related U.S. Application Data

[62] Division of Ser. No. 196,468, Oct. 14, 1980, Pat. No. 4,379,586.

[51] Int. Cl.$^3$ .............................................. B60J 7/10
[52] U.S. Cl. .................................. 296/221; 296/222; 296/223
[58] Field of Search ..................... 296/221, 222, 223

[56] References Cited

U.S. PATENT DOCUMENTS

| | | | |
|---|---|---|---|
| 3,822,912 | 7/1974 | Bienert | 296/137 |
| 3,964,784 | 6/1976 | Prechter et al. | 296/137 |
| 4,072,340 | 2/1978 | Morgan | 296/84 |
| 4,081,926 | 4/1978 | Jardin | 49/210 |
| 4,084,848 | 4/1978 | Cunningham | 296/137 |
| 4,085,956 | 4/1978 | Schlapp | 296/137 |
| 4,103,962 | 8/1978 | Schlapp | 296/137 |
| 4,159,144 | 6/1979 | Ehlen et al. | 296/137 |
| 4,210,359 | 7/1980 | Mori | 296/222 |

Primary Examiner—Robert R. Song
Attorney, Agent, or Firm—Basile, Weintraub & Hanlon

[57] ABSTRACT

A modular sliding roof panel assembly for a vehicle having an opening in the roof. The sliding roof panel assembly includes a movable roof panel having front and rear guide shoes engaging guide tracks mounted to an integrally formed plastic housing affixed to the interior side of the vehicle roof. Guide blocks secured to the longitudinal edges of the movable roof panel have cam tracks formed therein which are engaged by a cam follower mounted on the rear guide shoes to lower the rear edge of the movable roof panel below the stationary roof of the vehicle as the roof panel slides to the open position and to raise the rear edge of the roof panel above the stationary roof structure when the movable roof panel is pivoted about the front end. A water trough extending transversely across the rear edge of the housing is connected to the front guide shoes for sliding movement therewith. A detector for detecting the position of the movable roof panel is connected to a drive unit and actuator switches for controlling the movement of the movable roof panel between sliding and flip-up modes of operation.

12 Claims, 15 Drawing Figures

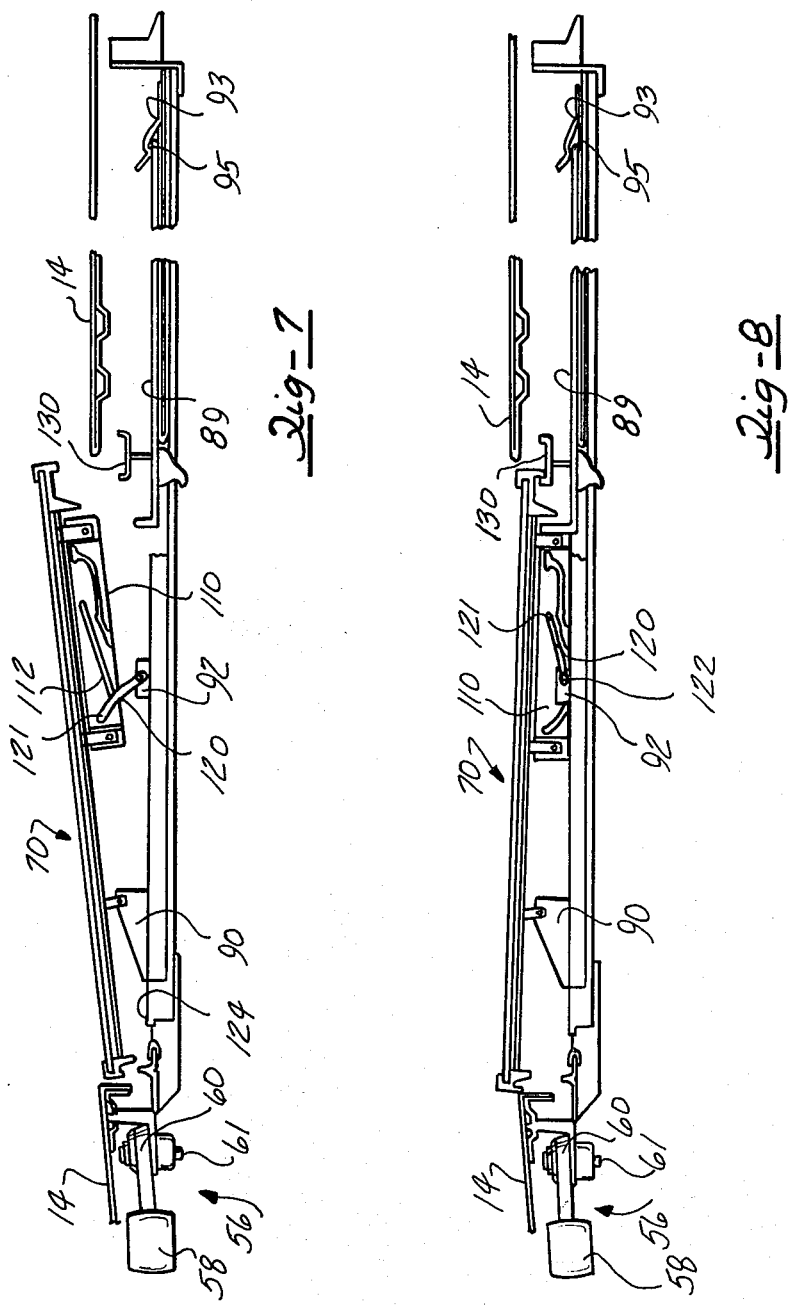

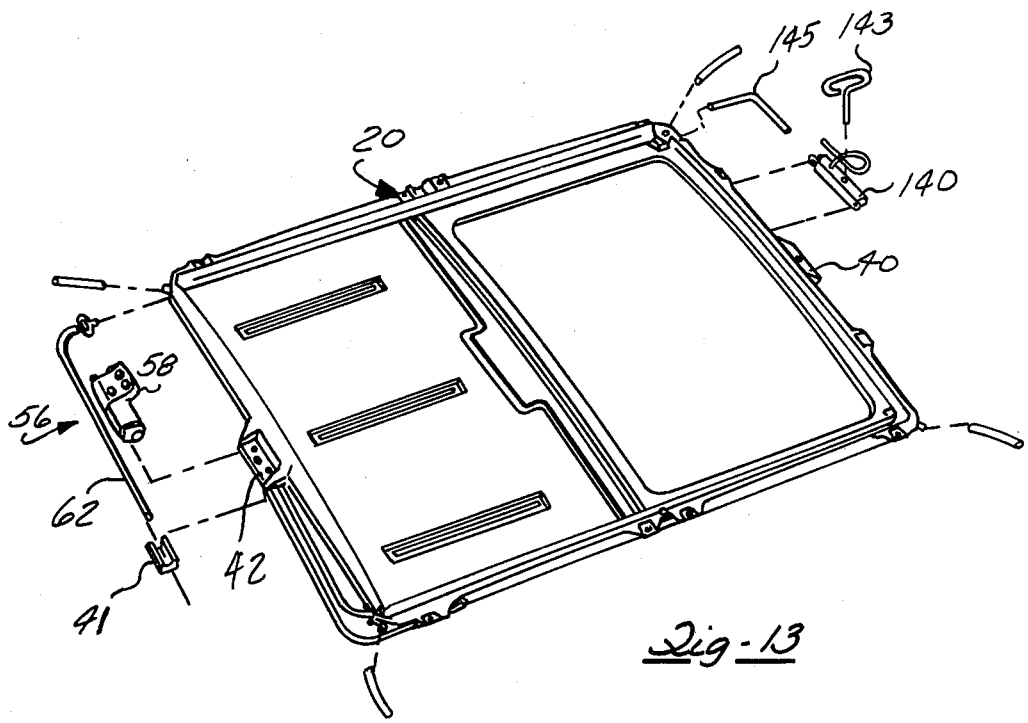
Fig-13
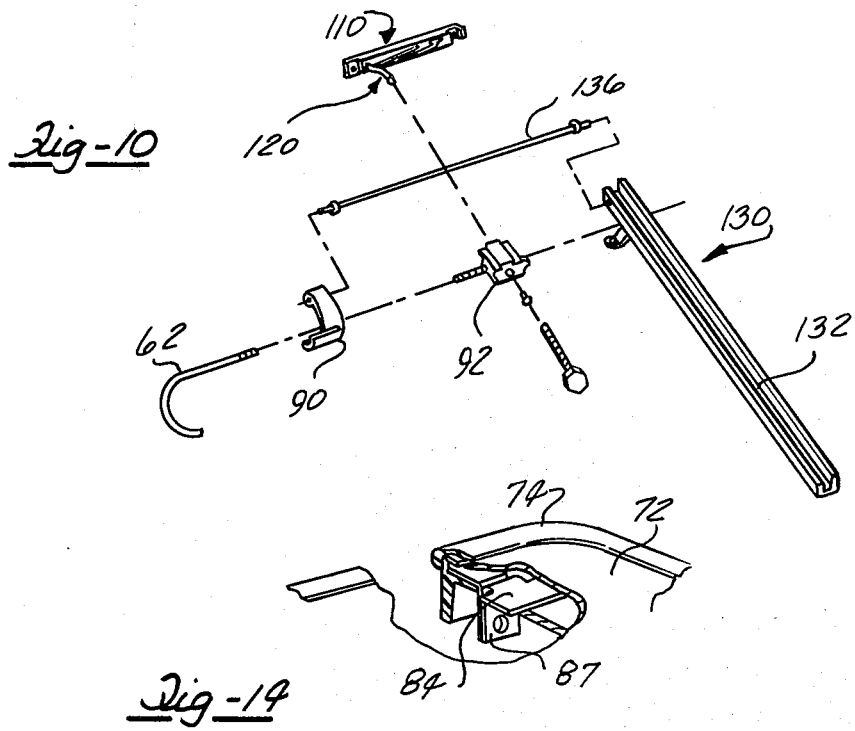
Fig-10
Fig-14

SLIDING ROOF PANEL ASSEMBLY

BACKGROUND OF THE INVENTION

1. Field of the Invention

This application is a division of application Ser. No. 196,468, filed Oct. 14, 1980, now U.S. Pat. No. 4,379,586.

This invention relates, in general, to vehicle roof structures and, more specifically, to vehicle roof structures including a movable roof panel for opening and closing an opening in the roof of a vehicle.

2. Description of the Prior Art

In today's automobile market, a popular option is the so-called "sun" or "moon" roof. The sunroof comes in two types, either in the form of a movable roof panel which is retractable between closed and open positions in an opening formed in the roof of the vehicle or a flip-up ventilator version which is pivotal about the front end to raise the rear edge of the roof panel a small amount above the stationary roof structure. It is also known to construct a movable roof panel which is both flip-up and sliding, as shown in U.S. Pat. No. 4,085,965.

However, the known roof panel assemblies present several disadvantages in view of the recent trend towards smaller and light weight vehicles. The mechanical components and structure needed to form a movable roof panel assembly and, in particular, a flip-up and sliding type of roof panel assembly are heavy and consume a considerable amount of space within the interior of the vehicle. This is especially undesirable due to the smaller size of the vehicles currently being produced.

Thus, it would be desirable to provide a modular movable roof panel structure for vehicles which overcomes the problems of similar prior art roof structures. It would also be desirable to provide a modular roof panel structure which provides both sliding and flip-up modes of operation. Finally, it would be desirable to provide a modular movable roof panel structure which is lighter in weight, provides increased interior head room and an enlarged viewing or window area and is made with a smaller number of components.

SUMMARY OF THE INVENTION

There is disclosed herein a new and improved modular sliding roof panel assembly for vehicles having an opening in the roof thereof. The modular sliding roof panel assembly includes an integrally formed housing constructed of a plastic material which is adapted to be mounted on the interior of the stationary roof structure of the vehicle. Guide rails are mounted to the housing and extend in the sliding direction of the movable roof panel. Front and rear guide shoes are mounted to the movable roof panel and engage the guide rails for controlling the sliding movement of the roof panel between open and closed positions. Drive means are operably connected to the rear guide shoes for moving the roof panel between open and closed positions. Guide blocks are mounted to the longitudinal edges of the movable roof panel and have cam tracks formed therein. Cam followers pivotally connected to the rear guide shoes are engageable with the guide blocks for selectively lowering the rear edge of the movable roof panel below the stationary roof structure as the roof panel slides rearward to the open position and for raising the rear edge of the movable roof panel a short distance above the stationary roof structure as the movable roof panel is pivoted about the front guide shoes. A water trough extends laterally across the rear edge of the housing. Means are provided for connecting the water trough to the front guide shoes such that the water trough moves concurrently with movement of the front guide shoes between open and closed positions. Means are provided for detecting the position of the movable roof panel and to control the operation of the drive means in both the sliding and flip-up modes of operation.

The sliding roof assembly of the present invention provides distinct advantages over similar prior art sliding roof assemblies. The one piece plastic housing having integrally formed brackets, mounting pads and drain conduits significantly reduces the weight of the overall roof assembly and the number of discrete components in the assembly compared to prior art sliding roof assemblies. Additional weight is eliminated from the sliding roof assembly by providing a movable roof panel having a plastic casing molded around the peripheral edge thereof. This also substantially increases the amount of viewing or window area in the movable roof panel. The housing is formed with front and rear mounting pads for the drive means which uniquely enable the drive means to be mounted along either of the front or rear edges of the housing to enable the use of the sliding roof structure of the present invention in many different types of vehicle applications without the necessity of redesigning or modifying the roof structure.

Means are provided to detect the position of the movable roof panel and to control the drive means in both the flip-up and sliding modes of operation. This prevents inadvertent or undesired movement of the roof panel after it has reached the full closed position from the flip-up or open positions. Finally, the structure of the sliding roof assembly is simplified by uniquely connecting a water trough disposed transversely along the rear edge of the housing to the front guide shoes for concurrent movement therewith. In this manner, the water trough is independent from the rear guide shoes and remains in proximity with the rear edge of the roof opening as the rear guide shoes continue to move to pivot the roof panel to the venting position.

BRIEF DESCRIPTION OF THE DRAWING

The various features, advantages and other uses of the present invention will become more apparent by referring to the following detailed description and drawing in which:

FIG. 7 is a sectional view showing the sliding roof assembly in the flip-up position;

FIG. 8 is a sectional view showing the sliding roof assembly in the partially opened position;

FIG. 10 is a partial exploded view depicting the arrangement of the guide shoes, cam bracket and water trough;

FIG. 13 is an exploded perspective view of the sliding roof assembly illustrating the rear mounting configuration of the drive means;

FIG. 14 is a cross-sectional view generally taken along line 13—13 in FIG. 5.

DESCRIPTION OF THE PREFERRED EMBODIMENTS

Figure 1:
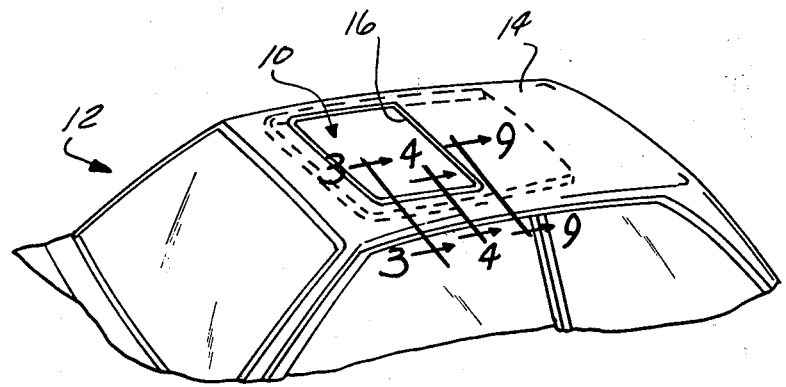
FIG. 1 is a partial pictorial view of a vehicle having a sliding roof assembly constructed according to the teachings of this invention mounted therein.

Throughout the following description and drawing, identical reference numerals are used to refer to the same component shown in multiple figures of the drawing.

Referring now to the drawing, and to FIG. 1 in particular, there is shown a modular sliding roof panel assembly 10 which is adapted to be mounted in the roof of a vehicle 12. The vehicle 12 includes a stationary roof structure 14 having an opening 16 formed therein. The opening 16 is preferably of rectangular configuration and is situated over the front seat of the vehicle 12. The opening 16 is opened and closed by a movable roof panel which slides between closed and opened positions as well as pivoting to a flip-up position.

Figure 2:
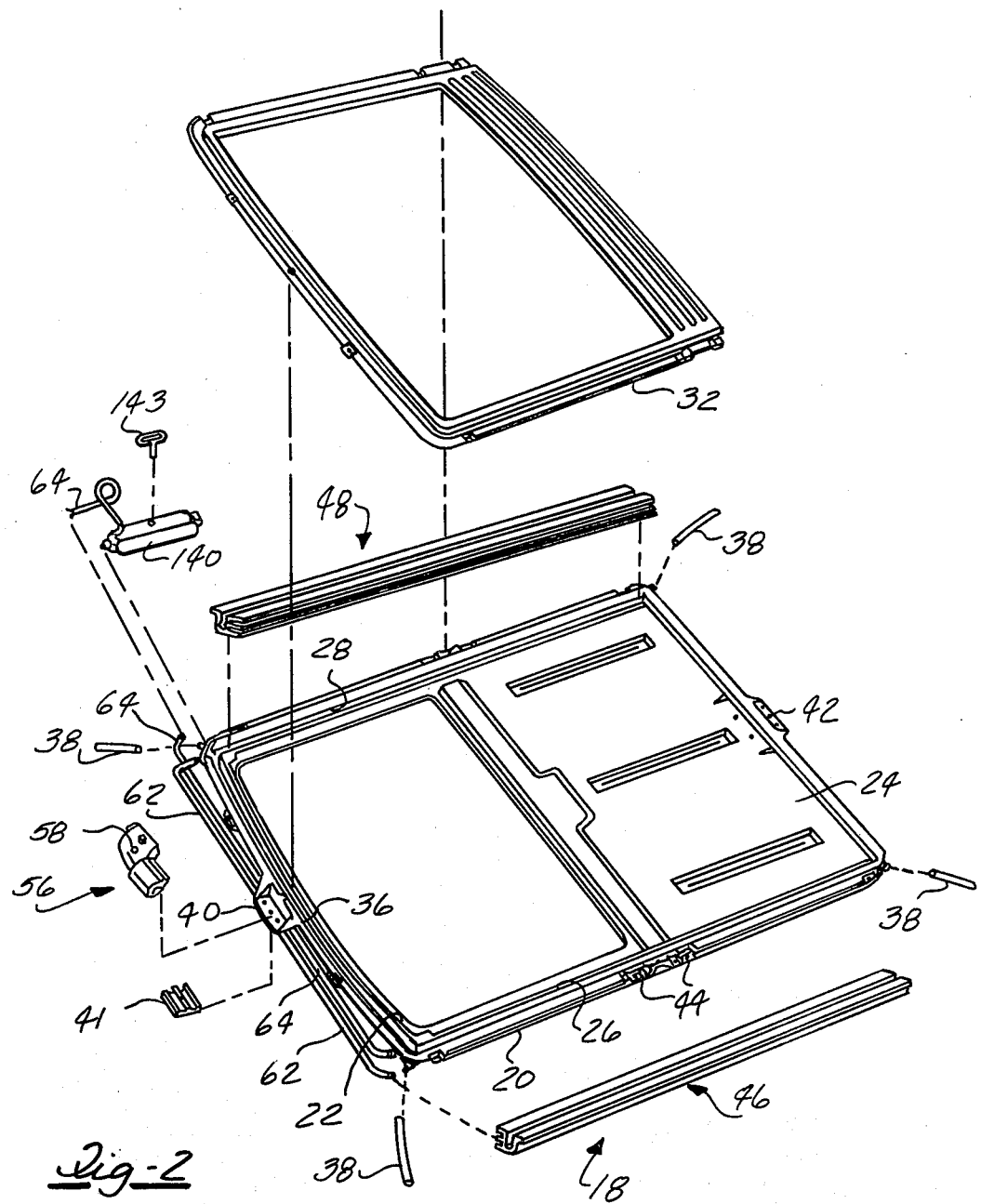
FIG. 2 is an exploded pictorial view of the sliding roof assembly.

Referring now to FIG. 2, there is shown a frame or housing assembly 18 which is adapted to be mounted to the interior of the stationary roof structure 14 of the vehicle 12. The frame 18 includes an integrally formed substantially rectangular housing 20. The housing 20 includes an aperture 22 which is configured to the approximate shape of the opening 16 in the roof 14 of the vehicle 12 and a planar solid rear section 24.

Preferably, the housing 20 is formed in an integral one piece unit from a stamped, lightweight material, such as fiberglass sheet molding compound (CSMC). Other materials, such as nylon or polypropylene based compounds, having the requisite high strength and lightweight properties may be used to form the housing. The housing 20 is formed to include mounting brackets, drain openings and stiffening ribs, as will be described in greater detail hereafter.

Figure 3:
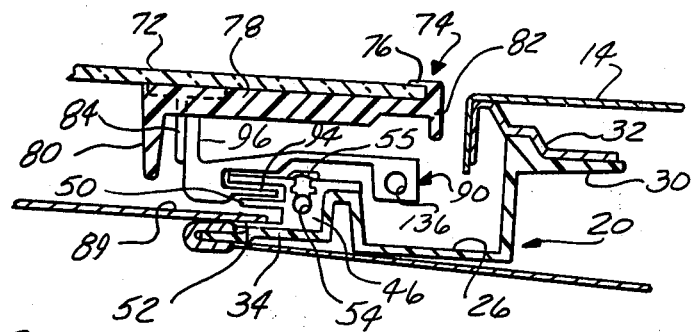
FIG. 3 is a cross sectional view, generally taken along line 3—3 in FIG. 1, illustrating the front guide shoe construction.
Figure 4:
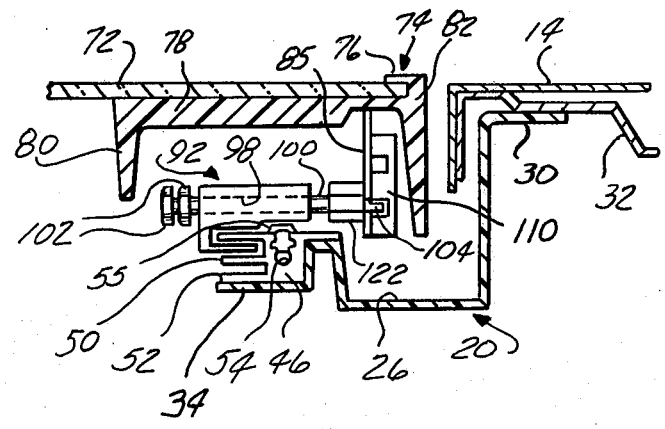
FIG. 4 is a cross sectional view, generally taken along line 4—4 in FIG. 1, showing the rear guide shoe construction.

Specifically, the housing 20 is formed with side drain troughs 26 and 28 which extend longitudinally along the sides of the housing 20. As shown in FIGS. 2, 3 and 4, the housing 20 is formed with an outwardly extending flange portion 30 which is adapted to be secured to a panel opening reinforcement member 32. Each of the identically formed side drain troughs, such as drain trough 26, is formed with a channel-like trough section which is connected between the outward flange 30 and an inward extending flange portion 34 which serves as a mounting base for the guide tracks of the movable roof panel assembly, as described in greater detail hereafter.

The side drain troughs 26 and 28 communicate with a front drain trough 36, shown in FIG. 2, which extends across the front of the housing 20. The corners of the housing 20 are formed with hollow conduits 38 which are adapted to be connected to suitable conduits or tubes which extend through the body of the vehicle 12 to form means for diverting water collected in the drain troughs 26, 28 and 36 of the housing 20 from the movable roof panel assembly 10 of the present invention.

Finally, the housing 20 is formed with front and rear mounting pads 40 and 42, respectively. The mounting pads 40 and 42 serve as a means for mounting the drive means, described hereafter, to the housing 20. This enables the drive means to be selectively mounted on either of the front or rear edges of the housing 20 depending upon the particular vehicle construction and application of the movable roof panel assembly 10 of the present invention.

As described above, and shown in FIG. 2, the housing 20 is adapted to be mounted to a panel opening reinforcement 32 which is of substantially rectangular configuration. The panel opening reinforcement 32 is formed of a metallic material, such as steel, and is adapted to be secured to the interior stationary roof structure 14 of the vehicle 12, such as be welding. The housing 20 is then secured by conventional fasteners through mounting brackets 44 to the reinforcing ring 32 to thereby mount the movable roof panel assembly 10 to the interior roof structure of the vehicle 12.

As shown in FIG. 2, and in greater detail in FIGS. 3 and 4, the movable roof panel assembly 10 includes a pair of guide tracks 46 and 48 which are mounted to the inward extending flange 34 of the housing 20. The guide tracks 46 and 48 are in the form of elongated members which are mounted on opposite sides of the vehicle 12 and extend in the sliding direction of the movable panel.

Each of the guide tracks 46 and 48 are formed with spaced flanges which define upper and lower tracks 50 and 52, respectively. The upper track 50 is adapted for engaging the guide shoe attached to the movable roof panel and serves to control the movement of the roof panel between open and closed positions. The lower track 52 is adapted for mounting a movable sunscreen, described hereafter, therein to enable the sunscreen to be moved between open and closed positions as desired. Each of the guide tracks 46 and 48 is formed with an integral bore 54 which extends longitudinally through the guide tracks 46 and 48. The bore 54 serves as a guide for the thrust transmitting cables utilized in the drive means of the present invention. A clip 55 is insertable in a recess formed in the top of the guide tracks 44 and 46 and in communication with the bore 54 to seal the bore 54.

As shown in FIG. 2, drive means 56 are provided for moving the movable roof panel between open and closed positions as well as between the closed position and a flip-up venting position. According to the preferred embodiment, the drive means 56 includes an electric drive motor 58 which has its output shaft connected to a gear assembly 60 which terminates in a bevel gear 61, as shown in FIGS. 7 and 8. The motor 58 and gear assembly 60 are mounted to either of the front or rear mounting pads 40 and 42 in the housing 20 such that the bevel gear 61 extends downward through an aperture in the mounting pad.

The movable roof panel is driven by the motor 58 and gear assembly 60 via thrust transmitting drive cables 62 and 64 which have one end secured to the rear guide shoes. The drive cables 62 and 64 have a helically wound structure on their surfaces adpated to engage the bevel gear 61. As the drive gear rotates, the cables 62 and 64 move in translation resulting in movement of the movable roof panel assembly linearly between its open or closed position as well as between closed and flip-up venting positions. The motor 58 is reversible and can be actuated to open or retract the movable roof panel assembly via a suitable switch or switches, not shown.

As shown in FIG. 2, the drive motor 58 and gear assembly 60 are secured to the front mounting pad 40 such that the bevel gear 61 extends downward through an aperture in the mounting pad 40. A block 41 is mounted to the bottom side of the front mounting pad 40. The block 41 has a pair of longitudinally extending bores extending therethrough adapted to slidingly receive the thrust transmitting cables. A perpendicular bore extends through the block 41 centrally between the longitudinal bores. The perpendicular bore receives the bevel gear 61 which engages the sides of the cables to cause movement thereof.

Referring briefly to FIG. 13, there is illustrated the rear mount configuration of the drive means. In this embodiment, the drive motor 58 and gear assembly 60 are secured to the rear mounting pad 42. The bevel gear 61 extends through the pad 42 to engage the cables extending through the block 41. The cables extend along the rear edge of the housing before being directed along the sides of the housing towards the front of the vehicle.

Figure 5:
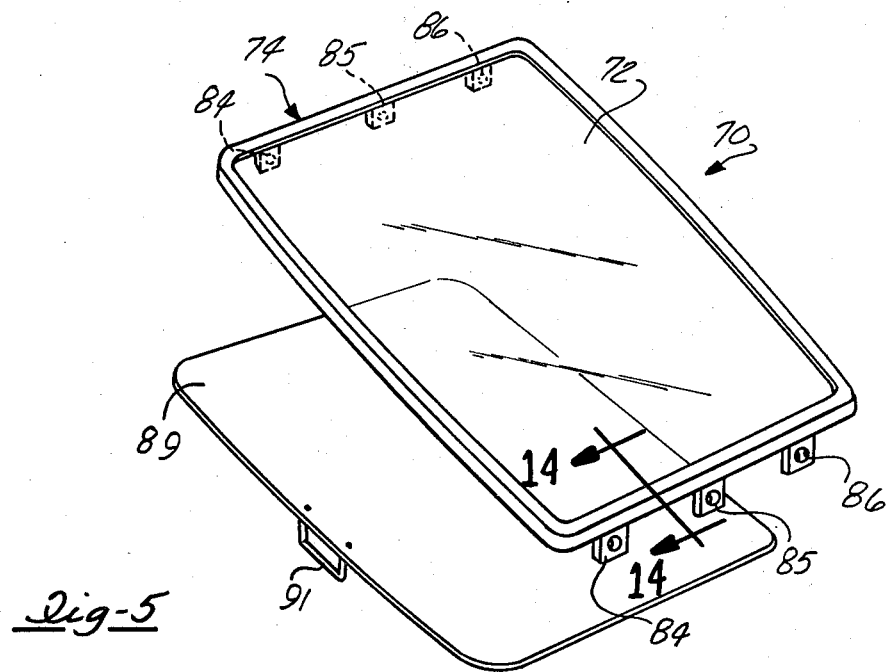
FIG. 5 is an exploded pictorial view of the movable roof panel assembly.

Referring now to FIG. 5, there is shown the detailed construction of the movable roof panel assembly 70. The movable roof panel assembly 70 includes a rectangularly shaped panel 72 which preferably is formed of transparent glass. The panel 72 is formed to approximately the same shape as the opening 16 in the roof 14 of the vehicle 12 so as to completely close the opening 16 when moved to the closed position. A casing or gasket 74 formed of a plastic material, such as polyvinyl chloride, is molded around the peripheral edge of the panel 72 and forms a means for supporting the panel 72. As shown in greater detail in FIGS. 3 and 4, the casing 74 is formed with an upper lip 76 which extends over the upper surface of the panel 72 and a base portion 78 in registry with the bottom surface of the panel 72. Downward extending flanges 80 and 82 extend from the base portion 78 and have a varying cross section along the length of the panel 72. Mounting brackets 84, 85 and 86 are integrally molded in the casing 74 along the side edges of the panel 72 and extend downward therefrom to provide a suitable mounting or support means for the various components of the sliding roof assembly, as described in greater detail hereafter.

As shown in FIG. 5 and in greater detail in FIG. 14, the brackets 84, 85 and 86 each have a substantially T-shaped configuration with the upper portion being molded and secured in the casing 74. A flange or leg 87 extends downward from the upper portion and has an aperture formed therein for mounting the sliding panel 72 to other components of the sliding roof panel assembly.

The movable roof panel assembly 70 includes a manually operable sunscreen 89 formed of an opaque material. The sunscreen 89 rides in the lower track 52 of the guide tracks 46 and 48 and enables the interior of the vehicle 12 to be completely closed off from view. A handle 91 is affixed to the front of the sunscreen 89 to enable the sunscreen 89 to be moved between open and closed positions as desired by the occupant of the vehicle 12. Further, a spring clip 93, as shown in FIG. 7, is mounted to the rear of the housing 20 and engages a bracket 95 mounted on the rear edge of the sunscreen 89 to securely retain it in the full-open position.

As shown in FIGS. 3 and 4, a pair of front and rear guide shoes located on opposed sides of the movable panel 70 are connected to the movable panel 70 and engage the guide tracks 46 and 48 to control the sliding of the movable panel 70 between open and closed positions.

As shown in FIG. 3, each of the front guide shoes 90 are formed with a flange portion 94 which is adapted to engage the upper track 50 in the guide tracks 46 and 48. The front guide shoes 90 further include an upwardly extending flange portion 96 which is pivotally connected to the mounting bracket 84 in the movable panel casing 74 to enable the movable panel 72 to be pivoted about the front guide shoes 90, as described hereafter. The front guide shoes 90 are mounted parallel to the longitudinal center line of the vehicle and are positioned directly above the guide tracks 46 and 48 to increase the amount of light opening or viewing area of the movable roof panel assembly of the present invention.

The rear guide shoes 92, shown in FIG. 4, are located adjacent the rear edge of the movable panel 72 and have one end of the drive cables 62 and 64 integrally molded or secured thereto. Thus, translation of the drive cables 62 and 64 in either forward or reverse directions will move the rear guide shoes 92 linearly along the guide tracks 44 and 46 which, in turn, will cause sliding movement of the movable roof panel assembly 70 and the front guide shoes 90 between opened and closed positions within the roof opening 16.

Each of the rear guide shoes 92 are further provided with a lateral bore 98 which is adapted to receive a threaded shaft 100. The ends of the threaded shaft 100 extend outward beyond the sides of the rear guide shoes 92. A pair of fasteners, such as threaded nuts 102, threadingly engage one end of the shaft 100 and provide for in and out adjustment of the shaft 100 with respect to the rear guide shoe 92. The opposed end of the shaft 100 is formed with a reduced diameter end section 104 which is adapted to engage and ride within a cam track in a guide bracket, as described in greater detail hereafter.

Figure 6:
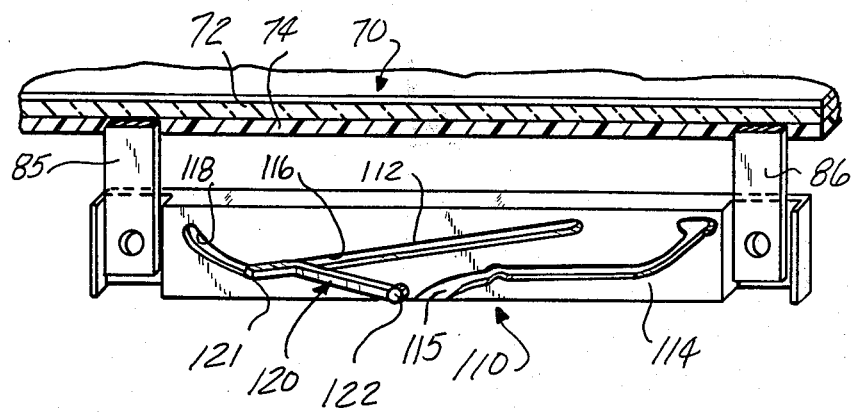
FIG. 6 is a plan view of the guide bracket.

Referring now to FIG. 6, there is shown one of a pair of symmetrically formed guide brackets 110 which are mounted to the longitudinal edges of the movable panel assembly 70 between front and rear guide shoes 90 and 92. As shown in FIG. 6, the guide bracket 110 is mounted by suitable fasteners to the mounting brackets 85 and 86 carried by the casing 74 of the movable roof panel assembly 70.

The guide bracket 110 includes first and second cam tracks 112 and 114. The first cam track 112 includes a first inclined portion 116 which extends upward from a curved or arcuate second portion 118. One end 121 of a cam follower 120 is slidingly secured wihin the first cam track 112 for sliding movement therealong. The second cam track 114 is generally inclined upward along its length and has an open end 115. The shaft 100 extending through the rear guide shoe 92, as shown in FIG. 4, is adapted to engage the second track 114 and move therealong. This provides additional stability for the movable roof panel assembly 70 throughout its sliding movement. The second end of the cam follower 120 is pivotally mounted on the shaft 100, FIG. 4, to provide a pivotal action for the cam follower 120.

Thus, the second end 122 of the cam follower 120 is maintained in the same horizontally extending plane throughout the sliding movement of the movable roof panel assembly 70. However, the first end 121 of the cam follower 120 pivots about the shaft 100 resulting in pivotal movement of the guide bracket 110 and the movable roof panel assembly 70 connected thereto.

This pivotal action is illustrated in FIG. 7 in which the movable roof panel assembly 70 is depicted in the flip-up ventilator position. Starting from the fully closed position in which the front guide shoes 90 abut front stops 124 formed in the housing 20, energization of the drive means 56 will cause translation of the drive cables and movement of the rear guide shoes 92 to the front of the vehicle or to the left as viewed in FIG. 7. The drive force generated by the drive cables causes the first end 121 of the cam followed 120 to move up the arcuate portion 118 of the cam track 112 in the guide bracket 110 and the rear edge of the roof panel assembly 70 connected thereto to rise, pivoting the entire roof panel assembly 70 about the front guide shoes 90.

Reversal of the drive motor 58 causes a reverse movement, lowering the roof panel assembly 70 until it is flush with the surface of the stationary roof structure of the vehicle.

The guide brackets 110 also function to lower the rear edges of the roof panel assembly 70 below the rear edge of the stationary roof structure so that the roof panel 70 can be slid rearward to the open position, as depicted in FIG. 8. As shown therein, actuation of the drive means 56 to move the roof panel assembly 70 from the closed to the open position initially causes the first end 121 of the cam follower 120 to move along the cam track 112. As the second end 122 of the cam follower 120 is fixed for movement along a horizontally extending plane, pivoting of the cam follower 120 about its second end 122 forces the guide bracket 110 and the rear edge of the movable roof panel assembly 70 connected thereto downward to clear the rear edge of the stationary roof structure 14 of the vehicle such that the roof panel assembly 70 can be slid beneath of the rear stationary roof structure.

When the roof panel assembly 70 is moved to the closed position, the cam follower 120 and guide brackets 110 interact to raise the rear edge of the roof panel assembly 70 into flush alignment with the rear portion of the roof of the vehicle.

Figure 15:
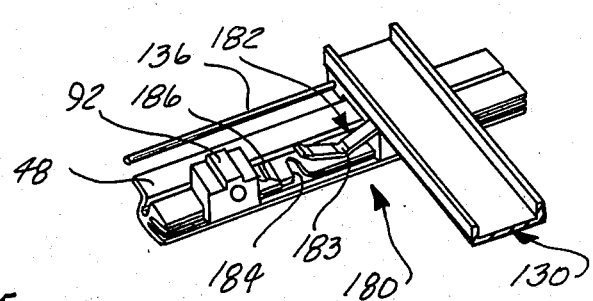
FIG. 15 is a partial view depicting the panel locking means.

As the roof panel 70 is moved between the flip-up position and the fully closed position, the rear guide shoes are urged rearward by the drive cables. In order to prevent any rearward movement of the roof panel 70 before it reaches the full closed position, a locking means 180, FIG. 15, is provided for holding the roof panel 70 in a fixed horizontal position until its rear edge has been lowered beneath the rear stationary roof of the vehicle.

The locking means 180 includes a spring clip 182 which is affixed to the water trough 130 at one end. The spring clip 182 is formed of a resilient material and is biased in a downward direction. The clip 182 has a depression 183 formed centrally therein which is adapted to engage a recess or notch 184 formed in the top surface of guide track 48. A finger 186 extends outward from rear guide shoe 92 to engage an upstanding flange formed at the end of the clip 182 to disengage the depression 183 from the notch 184.

In operation, the depression 183 in the clip 182 will be seated in the notch 184 when the roof panel 70 is in the flip-up ventilator position. As the roof panel 70 is lowered, the rear guide shoes 92 move in a rearward direction. However, the clip 182 will hold the water trough 130 and front guide shoes 90 which are connected together, in a fixed position. When the rear edge of the roof panel 70 has been lowered sufficiently to clear the rear stationary roof structure of the vehicle, the rear guide shoe 92 will have moved rearward to a position in which the finger 186 engages the upstanding flange on the clip 182 and urges the clip 182 upward until the depression 183 is released from the notch 184. This frees the entire movable roof panel 70 for rearward movement.

Figure 9:
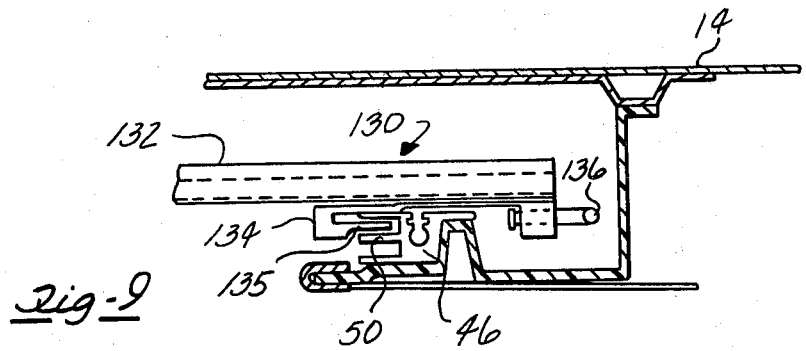
FIG. 9 is a partial sectional view generally taken along line 9—9 in FIG. 1 showing the construction of the water trough.

Referring now to FIGS. 2, 9 and 10, there is shown a water trough 130 which is adapted to divert water from the rear edge of the movable roof panel assembly 70 to the sides of the housing 20. The trough 130 is in the form of a channel-like member 132 which extends laterally across the vehicle. According to the preferred embodiment, the water trough 130 is movable in conjunction with movement of the movable roof panel assembly 70 between open and closed positions so as to divert water entering the roof opening adjacent the rear edge of the movable roof panel assembly 70 to the sides of the housing 20 and thence through the drain conduits out from the vehicle. Accordingly, a pair of guide shoes 134 each associated with one of the guide tracks 46 and 48 are secured to the bottom surface of the channel member 132 at opposite ends thereof. The guide shoes 134 are formed with a flange portion 135 which rides in the top track 50 of the gude track 46 to control the sliding movement of the water trough 130.

Means, denoted in general at reference number 136, are provided for connecting the water trough 130 to the front guide shoes 90, as shown in FIG. 10, to transmit movement from the first guide shoes 90 to the water trough 130. According to the preferred embodiment, the connecting means 136 is in the form of an elongated rod member having its first end secured or molded to the front guide shoe 90 and its rear end molded or otherwise secured to the guide shoe 134 affixed to the water trough 130. In this manner, the water trough 130 moves concurrently with movement of the front guide shoes 90 between the open and closed positions. In addition, the water trough 130 remains in its forward position adjacent the rear edge of the roof opening 16 when the movable roof panel assembly 70 is pivoted to the flip-up venting position.

Figure 11:
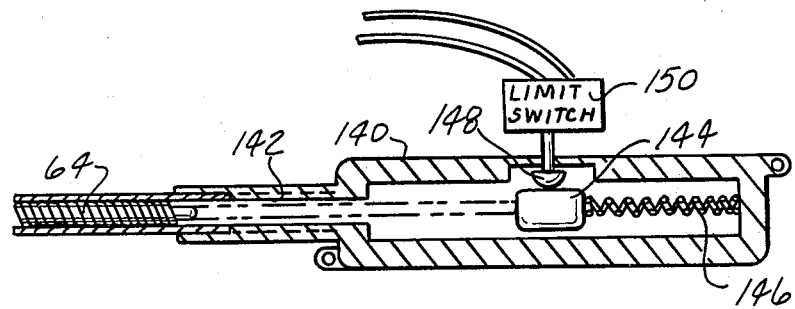
FIG. 11 is a sectional view of one embodiment of the control unit of the present invention.

As shown in FIG. 2, and in greater detail in FIG. 11, the sliding roof assembly of the present invention further includes control means for controlling the movement of the roof panel between open and closed positions and the closed and flip-up venting positions. The control means includes a housing 140 mounted to the internal roof structure of the vehicle adjacent the side of the housing 20. The housing 140 includes a hollow bore 142 which is adapted to receive one end of one of the drive cables, such as drive cable 64. One end of the drive cable 64 is insertable within the interior of the housing 140 and contacts a movable actuator 144 movably disposed within the housing 140 which is biased by a biasing means, such as a coil spring 146, to a central or neutral position within the housing 140, as shown in FIG. 11. The housing 140 is positioned with respect to the roof housing 20 such that the end of the drive cable 64 will contact the actuator 144 at the neutral position when the movable roof panel 70 is in the completely closed position. An arming pin 143, in FIG. 2, is removably inserted through an aperture in the housing 140 to engage the actuator 144 and hold it in the neutral position until the housing 140 is secured in position.

In the neutral position, the actuator 144 trips a plunger 148 connected to a conventional electrical limit switch causing the output contacts of the limit switch 50 to move to a closed position. The contacts of the limit switch 50 are connected in a suitable control circuit arrangement with the drive motor 58 and the occupant operated actuator switches to control the movement of the sliding roof between open and closed positions.

When the roof panel 70 is in the closed position, the plunger 148 of the switch 150 will be depressed causing the output contacts to switch positions and, through the control circuitry, enable the actuator switches to drive the motor in either forward or reverse direction, as desired. Whenever the roof panel is moved from the closed position to the flip-up vent position, cable 64 will linearly translate causing the actuator 144 to move to the right in the orientation depicted in FIG. 11. This enables the plunger 148 to extend outward from the switch 50 causing the contacts of the limit switch 150 to again change position to disconnect the rearward movement actuator switch from the drive motor thereby preventing inadvertent rearward movement.

When the roof panel 70 has been lowered to the closed position, the end of the drive cable will have retracted sufficiently to enable the biasing means 146 to move the actuator 144 to the neutral position closing the control circuit.

When the roof panel 70 is moved rearward from the closed position, the cable will retract from the housing 140 and the biasing means 146 will urge the actuator 144 forward disabling the flip-up actuator switches.

Time delay means, not shown, in the form of a conventional time delay relay are provided within the housing 140 to provide a predetermined amount of time delay after the roof panel has reached the closed position. The time delay means are responsive to the means for detecting the position of the panel such that after the movable roof panel reaches the completely closed position, the time delay means will provide a predetermined amount of time, from approximately 3 to 10 seconds, for example, before the flip-up or rearward movement actuator switches are operably connected to the drive motor. This prevents the inadvertent or undesired further movement of the roof panel assembly rearward or to the flip-up ventilator position unless the appropriate actuator switches are then activated in the occupant. If it is desired to continue movement of the roof panel assembly, the occupant of the vehicle need only continually depress the appropriate actuator switches until the time delay has expired in order to again energize the drive motor 56 and move the roof panel assembly to the desired position.

The above-described operation of the control means applies to forward mounted drive motors wherein the drive cables pull the roof panel 70 from open to closed positions. In rear mounted drive motor configurations, the drive cables operate to push the roof panel 70 from open to closed positions. In this configuration, an idler cable 145, shown in FIG. 13, is attached at one end to one of the front guide shoes 90. The other end of the idler cable 145 enters the housing 140 to actuate the actuator 144 in the same manner as described above.

Figure 12:
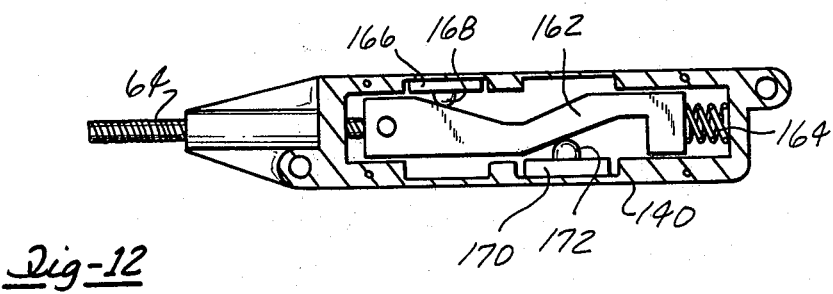
FIG. 12 is a sectional view of another embodiment of the control unit.

Referring now to FIG. 12, there is shown another embodiment of the control means used to control movement of the movable roof panel assembly. In this embodiment, a movable plunger 162 is disposed within the interior of the housing 140. One end of the drive cable 64 contacts one end of the plunger 162 causing movement thereof as the drive cable 64 translates. A suitable biasing means 164, such as a coil spring, contacts the opposed end of the plunger 162 biasing it to a central neutral position, as shown in the orientation illustrated in FIG. 12. The plunger 162 is formed with opposed inclined cam-type surfaces which are adapted to engage the plungers 168 and 172 of the first and second electrical switches 166 and 170, respectively. The outputs of the switches 166 and 170 are connected in a control circuit, not shown, with the actuator switches and the drive motor 58 to control the movement of the movable roof panel assembly in the same manner as described above.

In summary, there has been disclosed a new and improved modular sliding roof assembly for a vehicle having an opening in the roof thereof. The modular sliding roof assembly includes a movable roof panel having front and rear guide shoes engaging guide tracks mounted to an integrally formed plastic housing affixed to the vehicle roof. Guide blocks secured to the longitudinal edges of the movable roof panel have cam tracks formed therein which are engaged by a cam follower mounted on the rear guide shoes to lower the rear edge of the movable roof panel below the stationary roof of the vehicle as the roof panel slides to the open position and to raise the rear edge of the roof panel above the stationary roof structure when the movable roof panel is pivoted about the front end. A water trough extending transversely across the rear edge of the housing is connected to the front guide shoes for sliding movement therewith. A detector for detecting the position of the movable roof panel is connected to the drive unit and actuator switches for controlling the movement of the movable roof panel between sliding and flip-up modes of operation.

What is claimed is:

1. A modular sliding roof panel assembly adapted to be mounted to the stationary roof structure of a veicle having an opening in the roof thereof which is opened and closed by the sliding roof panel, said assembly comprising:
   an integral housing adapted to be mounted to the interior of said stationary roof structure of said vehicle, said housing having an aperture therein aligned with said opening in said roof of said vehicle;
   a movable roof panel;
   guide rails mounted to said housing and extending in the sliding direction of said movable roof panel;
   front and rear guide shoes mounted to said movable roof panel and engaging said guide rails for controlling the movement of said movable roof panel between open and closed positions, said front guide shoes being pivotally mounted to said movable roof panel, said rear guide shoes having a first portion slidably engaging said guide rails and a second integral portion positioned over said guide rails and extending laterally outward therefrom;
   drive means operably connected to at least one of said front and rear guide shoes for moving said movable roof panel between open and closed positions;
   guide blocks mounted to said movable roof panel and having a cam track formed therein, said guide blocks being positioned laterally outward from said guide rails and cam follower means pivotally mounted to said second portion of said rear guide shoes and engageable with said guide blocks for selectively raising the rear edge of said movable roof panel above said stationary roof structure of said vehicle and for lowering said rear edge of said movable roof panel below said stationary roof structure such that said movable roof panel can slide beneath said stationary roof opening.

2. The assembly of claim 1 wherein the housing is formed of a fiberglass-reinforced plastic material.

3. The assembly of claim 1 wherein the housing includes front and rear mounting means adapted to mount the drive means thereon such that said drive means may be selectively mounted at either of the front and rear of said housing.

4. The assembly of claim 1 wherein the movable roof panel comprises:
a roof panel having a shape approximate that of the roof opening, said roof panel having a peripheral edge;
a casing formed of plastic material molded around said peripheral edge of said roof panel; and
a plurality of mounting brackets molded in said casing along the longitudinal sides of said movable roof panel and extending downward therefrom, said front guide shoes and said guide blocks being attached to said mounting brackets.

5. The assembly of claim 4 wherein the roof panel is formed of transparent glass.

6. A roof structure for a vehicle having an opening in the roof thereof comprising:
an integral housing mounted to the interior of said roof of said vehicle, said housing having an aperture aligned with the opening in the roof of said vehicle;
a movable roof panel;
guide rails mounted to said housing and extending in the sliding direction of said movable roof panel;
front and rear guide shoes mounted to said movable roof panel and engaging said guide rails for controlling the movement of said movable roof panel between open and closed positions, said front guide shoes being pivotally mounted to said movable roof panel, said rear guide shoes having a first portion slidably engaging said guide rails and an integral second portion positioned over said guide rails and extending laterally outward therefrom;
drive means operably connected to at least one of said front and rear guide shoes for moving said movable roof panel between open and closed positions;
guide blocks mounted to said movable roof panel and having a cam track formed therein, said guide blocks being positioned laterally outward from said guide rails; and
cam follower means pivotally mounted to said second portion of said rear guide shoes and engageable with said guide blocks for selectively raising the rear edge of said movable roof panel above said stationary roof structure of said vehicle and for lowering said rear edge of said movable roof panel below said stationary roof structure such that said movable roof panel can slide beneath said stationary roof opening.

7. The assembly of claim 6 wherein the housing is formed of a fiberglass-reinforced plastic material.

8. The assembly of claim 6 wherein the housing includes front and rear mounting means adapted to mount the drive means thereon such that said drive means may be selectively mounted at either of the front and rear of said housing.

9. The assembly of claim 6 wherein the movable roof panel comprises:
a roof panel having a shape approximate that of the roof opening, said roof panel having a peripheral edge;
a casing formed of plastic material molded around said peripheral edge of said roof panel; and
mounting brackets molded in said casing along the longitudinal sides of said movable roof panel and extending downward therefrom, said front guide shoes and said guide blocks being attached to said mounting brackets.

10. The assembly of claim 9 wherein the roof panel is formed of transparent glass.

11. A modular sliding roof panel assembly adapted to be mounted to the stationary roof structure of a vehicle having an opening in the roof thereof which is opened and closed by the sliding roof panel, said assembly comprising:
an integral housing adapted to be mounted to the interior of said stationary roof structure of said vehicle, said housing having an aperture therein aligned with said opening in said roof of said vehicle;
a movable roof panel;
guide rails mounted to said housing and extending in the sliding direction of said movable roof panel;
front and rear guide shoes mounted to said movable roof panel and engaging said guide rails for controlling the movement of said movable roof panel between open and closed positions, said front guide shoes being pivotally mounted to said movable roof panel, said rear guide shoes having a first portion slidably engaging said guide rails and a second integral portion positioned over said guide rails and extending laterally outward therefrom;
drive means operably connected to at least one of said fornt and rear guide shoes for moving said movable roof panel between open and closed positions; and
means, connected to the outer end of said second portion of said rear guide shoes and said movable roof panel, for raising and lowering the rear edge of said movable roof panel as said movable roof panel moves between open and closed positions.

12. A modular sliding roof panel assembly adapted to be mounted to the stationary roof structure of a vehicle having an opening in the roof thereof which is opened and closed by the sliding roof panel, said assembly comprising:
an integral housing adapted to be mounted to the interior of said stationary roof structure of said vehicle, said housing having an aperture therein aligned with said opening in said roof of said vehicle;
a movable roof panel;
guide rails mounted to said housing and extending in the sliding direction of said movable roof panel;
front and rear guide shoes mounted to said movable roof panel and engaging said guide rails for controlling the movement of said movable roof panel between open and closed positions, said front guide shoes being pivotally mounted to said movable roof panel, said rear guide shoes having a first portion engaging said guide rails and a second integral portion positioned over said guide rails and extending laterally outward therefrom;

drive means operably connected to at least one of said front and rear guide shoes for moving said movable roof panel between open and closed positions;

means, connected to the outer end of said second portion of said rear guide shoes and said movable roof panel, for raising and lowering the rear edge of said movable roof panel as said movable roof panel moves between open and closed positions; and the housing including front and rear mounting means for said drive means such that said drive means may be selectively mounted on one of said front and rear mounting means.

* * * * *